UNITED STATES PATENT OFFICE.

DANL. E. SOMES, OF WASHINGTON, DISTRICT OF COLUMBIA.

IMPROVEMENT IN BUILDINGS OR ROOMS FOR THE PRESERVATION OF FOOD AND FOR OTHER PURPOSES.

Specification forming part of Letters Patent No. 46,276, dated February 7, 1865.

*To all whom it may concern:*

Be it known that I, DANIEL E. SOMES, of Washington, in the District of Columbia, have invented a new and useful Improvement in Buildings and Rooms for the Preservation of Food and the Manufacture of Ice, and for Cooling and Ventilating the Same; and I do hereby declare the following to be a full and exact description of the same.

I construct a building or room with a series of walls, roofs, and floors with air-chambers. The walls separating these chambers I make of wood, metal, or other suitable material, or I may make one or more of them of cork or glass. The chamber adjoining the interior of the room or building, and one or more of the others, if desired, I fill with ice and salt or any other cold mixture or substance that will produce the desired effect. I construct the top or roof in such a manner that the ice or cooling substance may be easily introduced to a large chamber communicating with the interior chambers of the walls and floor, so that the cold substance will fill all the space surrounding the interior.

To increase the coolness and secure ventilation, in the interior of the building or room I place a pipe, (or more than one, if desired,) the upper end opening in the air outside and opened and closed by a stop-cock or valve, and the lower end communicating with the interior of the compartment or building, either from above or by being carried between two of the walls down and opening into the interior near the floor. This pipe may be of the same size throughout, or, as is preferable, the lower end may be the larger. The pipe being surrounded by the cold substance before mentioned, the air entering at the upper end becomes cold, and, being thus made heavier, falls by its own weight and enters the interior.

For carrying off the heated and impure air and gases that may be thrown off by the substances in the interior of the room or building, I place one or more pipes running from the interior to the outer atmosphere, and also regulated by stop-cocks, the lower end of the latter pipe being above that of the former. By this arrangement I secure a circulation of pure air without raising the temperature.

When this method of ventilation and cooling is applied to rooms and buildings where an unusually low temperature is not desired, the pipe through which the cool air is introduced may, instead of passing through ice or any similar cold substance, be conducted through tanks of water or in the ordinary water-pipes used in such buildings, and a sufficient degree of coolness be thus obtained.

I may, if desired for the cooling and ventilation of theaters, churches, hospitals, or other buildings and rooms, construct the pipes for the purpose of cooling through wells, and also tanks or other bodies of water or cooling substance, and where the air thus cooled does not of its own weight enter the room or building, owing to the bodies of cooling material being below the place designated to be cooled, or other cause, I may force the air in by means of air-pumps or their equivalents.

In a building erected with the series of walls and cooling appliances described I may construct a smaller building or compartment with the same appliances, and others for producing cold—such as rarefaction, evaporation, or any other method which may accomplish the purpose—so that a greater degree of cold may be obtained in this interior or second structure or compartment. While the outer and larger building may have an atmosphere sufficiently cold for the preservation of meats and vegetables therein, in the inner one a temperature low enough for the manufacture of ice may be secured. Thus both may be used for different purposes simultaneously. I may also construct in this interior building or compartment another, if desired, in the same manner that the second is placed in the first, or any number, one within another, thus increasing in each the degree of cold.

I prefer to use double or multiple wall, roof, and floors, with intervening air-spaces, as above described; but I do not limit myself to this construction. The thing necessary is that the walls, roof, and floors should be such as not readily to conduct heat. When a single wall, roof, or floor is made of non-conducting materials and of sufficient thickness it may answer my purpose.

What I claim as new and of my invention, and desire to secure by Letters Patent, is—

1. The walls and chambers, as described, in combination with the cooling and ventilating pipes, constructed and used as and for the purpose set forth.

2. The series of rooms and buildings, substantially in the manner and for the purpose shown.

3. The series of walls and chambers, when used in combination with a process of rarefaction and ventilation and cooling appliances.

4. Cooling the air in buildings in which water tanks or pipes are used by passing the air tubes or ducts through, in, between, or around the water pipes or tanks.

D. E. SOMES.

Witnesses:
 FRED B. GINN,
 J. C. SMITH.